US007934741B1

(12) United States Patent
Wright

(10) Patent No.: US 7,934,741 B1
(45) Date of Patent: May 3, 2011

(54) SAFETY BAR DEVICE FOR MOTORCYCLES

(76) Inventor: Randall R. Wright, Willoughby, OH (US)

( * ) Notice: Subject to any disclaimer, the term of this patent is extended or adjusted under 35 U.S.C. 154(b) by 0 days.

(21) Appl. No.: 12/543,444

(22) Filed: Aug. 18, 2009

(51) Int. Cl.
*B62J 27/00* (2006.01)

(52) U.S. Cl. .................. 280/304.4; 280/288.4; 280/219; 224/421

(58) Field of Classification Search .................. 280/748, 280/288.4, 290, 304.3, 304.4, 304.5, 47.36, 280/47.315; 16/426; 224/413, 421
See application file for complete search history.

(56) References Cited

U.S. PATENT DOCUMENTS

| | | | | |
|---|---|---|---|---|
| 4,030,750 | A | 6/1977 | Abram | |
| 5,002,149 | A | 3/1991 | Watanabe et al. | |
| 5,020,560 | A * | 6/1991 | Turbeville | 135/67 |
| 5,667,232 | A | 9/1997 | Gogan et al. | |
| 5,915,723 | A * | 6/1999 | Austin | 280/651 |
| 6,152,474 | A * | 11/2000 | Rupert | 280/291 |
| 6,568,699 | B2 | 5/2003 | McCann | |
| 6,578,652 | B1 * | 6/2003 | Kobacker et al. | 180/219 |
| 6,868,584 | B2 | 3/2005 | Trottier | |
| 6,896,279 | B2 | 5/2005 | Galvagno | |
| 6,966,471 | B1 | 11/2005 | Wilson et al. | |
| D521,418 | S | 5/2006 | Lee | |
| D621,327 | S * | 8/2010 | Wright | D12/222 |
| 2003/0006082 | A1 | 1/2003 | Popoff | |

OTHER PUBLICATIONS www.denniskirk.com; PowerMadd Rider Hold-Tight; Internet posting; As of Aug. 18, 2009.

* cited by examiner

*Primary Examiner* — Tony H. Winner

(57) ABSTRACT

A retractable safety bar device for a rear passenger of a motorcycle comprising a gripping component comprising a side bars adapted for telescopically receiving a inner bars, wherein the safety bar device is adjustable in height by moving the gripping component upwardly and downwardly with respect to the first inner bars, wherein the gripping component can be locked in place via a first locking mechanism; and mounting brackets pivotally attached to the inner bars, wherein the mounting brackets are for attaching the inner bars to sides of the motorcycle; wherein the safety bar device is adjustable in position by moving the inner bars forwardly and backwardly with respect to the mounting brackets, wherein the inner bars can be locked in place via a second locking mechanism.

8 Claims, 6 Drawing Sheets

100
102

SAFETY BAR DEVICE FOR MOTORCYCLES

FIELD OF THE INVENTION

The present invention is directed to a safety bar on a motorcycle, more particularly to a retractable safety bar for stabilizing a rear motorcycle passenger.

BACKGROUND OF THE INVENTION

Typically, a rear passenger on a motorcycle must rely on gripping the driver (e.g., his/her jacket, his/her abdomen, etc.) for stabilization. Gripping on the driver can be both uncomfortable for the rear passenger and dangerous. For example, gripping onto the driver may not provide a sufficient grip for the passenger, and if a sudden acceleration or turn is made, the passenger is at risk of falling off of the motorcycle. The present invention features a safety bar device for a rear motorcycle passenger. The device of the present invention may help provide comfort and peace of mind to passengers.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Referring now to FIGS. 1-6, the present invention features a retractable safety bar device 100 for rear passenger of a motorcycle. Without wishing to limit the present invention to any theory or mechanism, it is believed that the motorcycle safety bar 100 of the present invention is advantageous because it can provide safety and comfort to a rear passenger by helping reduce the risk of falling off the motorcycle when a sudden acceleration or steering adjustment is made.

Figure 1:
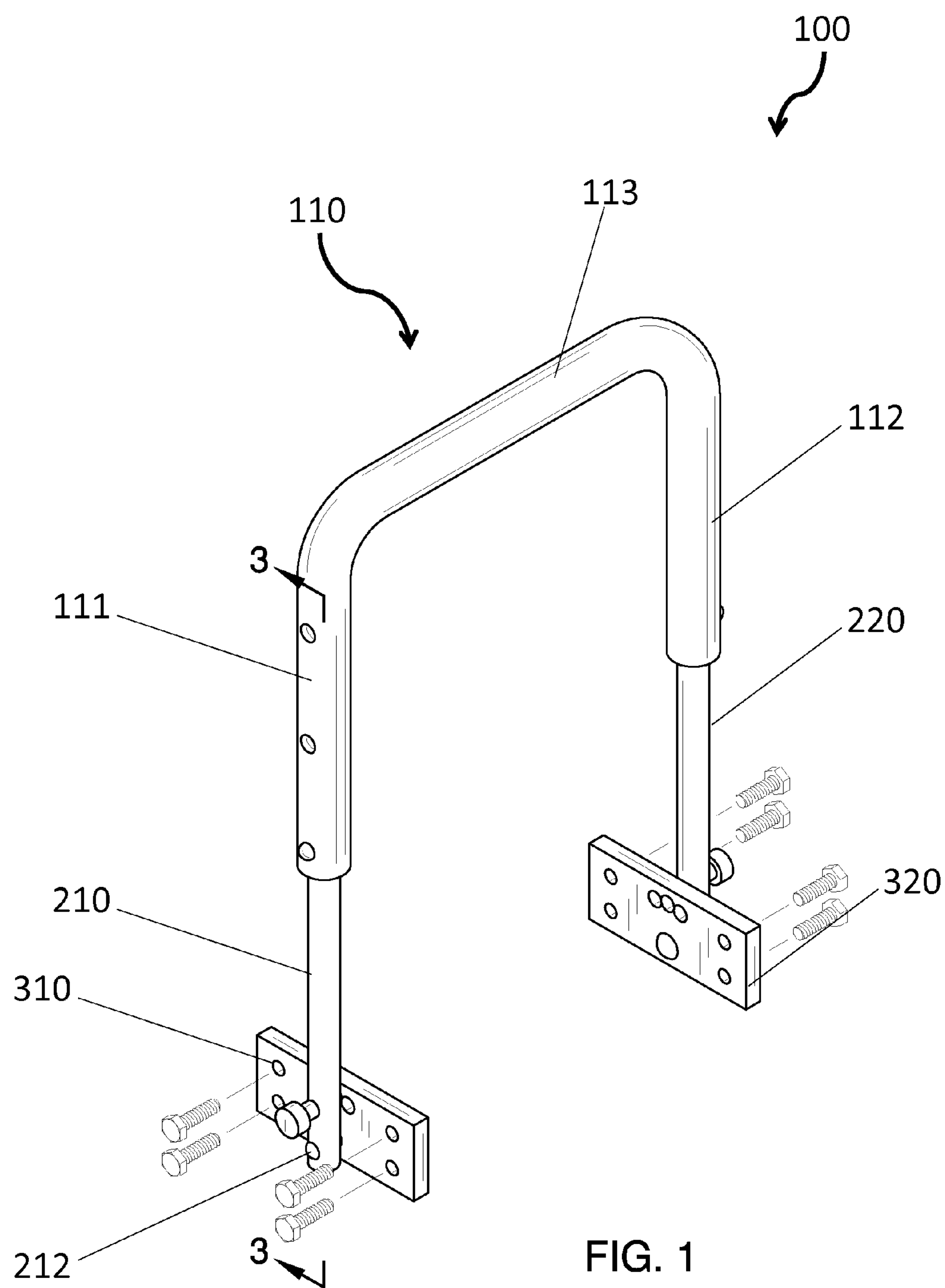
FIG. 1 is a perspective view of the safety bar device of the present invention.

As shown in FIG. 1., the safety bar device 100 of the present invention comprises a gripping component 110. The gripping component 110 is a bar that is secured to the motorcycle 102 (e.g., the sides of the motorcycle 102). In some embodiments, the gripping component 110 is generally U-shaped. In some embodiments, the gripping component 110 is generally V-shaped, arc-shaped, the like, or a combination thereof. The gripping component 110 may be irregular in shape.

The gripping component 110 comprises a first side bar 111, a second side bar 112, and a horizontal bar 113 connecting the first side bar 111 with the second side bar 112. The first side bar 111 may be generally hollow and adapted for telescopically receiving a first inner bar 210. The second side bar 112 may be generally hollow and adapted for receiving a second inner bar 220.

The first inner bar 210 has a first end and a second end 212, wherein the first end is for inserting into the first side bar 111 of the gripping component 110. The second end 212 of the first inner bar 210 is for attaching to the motorcycle. In some embodiments, the second end of the first inner bar 210 is attached to the motorcycle 102 via a first mounting bracket 310.

The second inner bar 220 has a first end and a second end 222, wherein the first end is for inserting into the second side bar 112 of the gripping component 110. The second end 222 of the second inner bar 220 is for attaching to the motorcycle. In some embodiments, the second end of the second inner bar 220 is attached to the motorcycle via a second mounting bracket 320.

Figure 4:
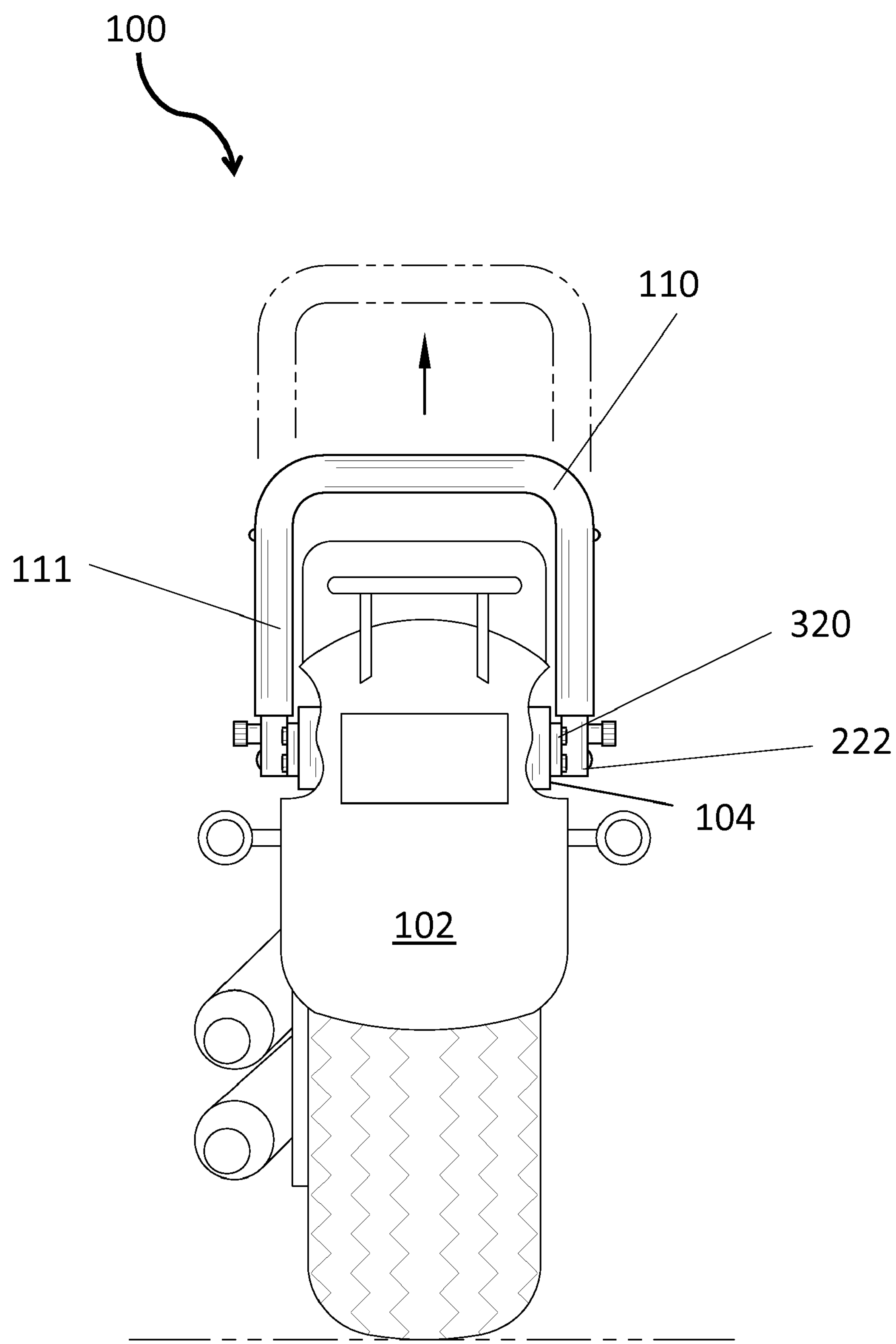
FIG. 4 is a back view of the safety bar device of FIG. 1 as attached to a motorcycle.

As shown in FIG. 4, the brackets (e.g., first mounting bracket 310, second mounting bracket 320) may be attached to the left side of the frame of the motorcycle 102 and the right side 104 of the frame of the motorcycle 102. The brackets may be attached to the motorcycle 102 via an attachment means, for example a screw/bolt mechanism.

Figure 3:
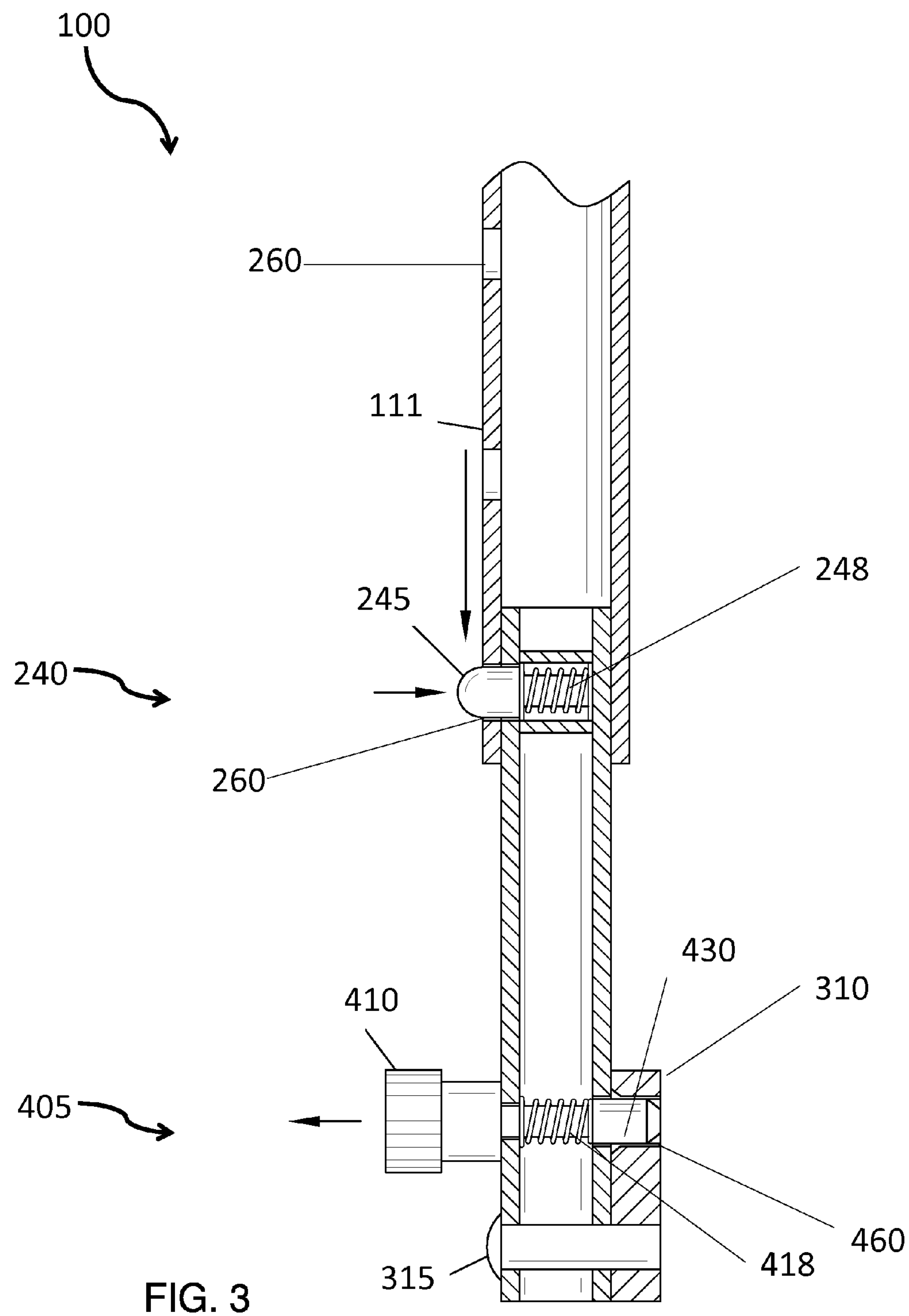
FIG. 3 is a side cross sectional view of the safety bar device of FIG. 1.

The safety bar device 100 is adjustable in height, for example the gripping component 110 can be moved upwardly and downwardly with respect to the first inner bar 210 and second inner bar 220. When a particular height of the gripping component 110 is chosen, the gripping component 110 can be locked in place via a first locking mechanism. As shown in FIG. 3, in some embodiments, the first locking mechanism may comprise a spring-loaded push button 240. Spring-loaded push buttons are well known to one of ordinary skill in the art. In some embodiments, a spring-loaded push button 240 may be disposed in the first inner bar 210 at or near the first end. The spring-loaded push button comprises a button component 245 that is insertable into an aperture 260 disposed in the first side bar 111 of the gripping component 110. The button component 245 can move between an in position (where it is inside the first inner bar 210) and an out position (where it extends out of the first inner bar 210 and in some instances through an aperture 260). The button component 245 is biased in the out position caused by a first spring 248. To move the gripping component 110 upwardly and downwardly with respect to the first inner bar 210 and second inner bar 220, a user can push the button component 245 to the in position and slide the gripping component 110 upwardly or downwardly. When the user has chosen an appropriate position for the gripping component 110, he/she can release the button component 240 and allow it to return to the out position and extend through an aperture 260 in the first side bar 111 of the gripping component. The first locking mechanism is not limited to a spring-loaded push button.

In some embodiments, the gripping component 110 (e.g., horizontal bar 113) can be moved downwardly such that it is flush over the seat of the motorcycle 102. This may be advantageous for when the device 100 of the present invention is not being used.

Figure 2:
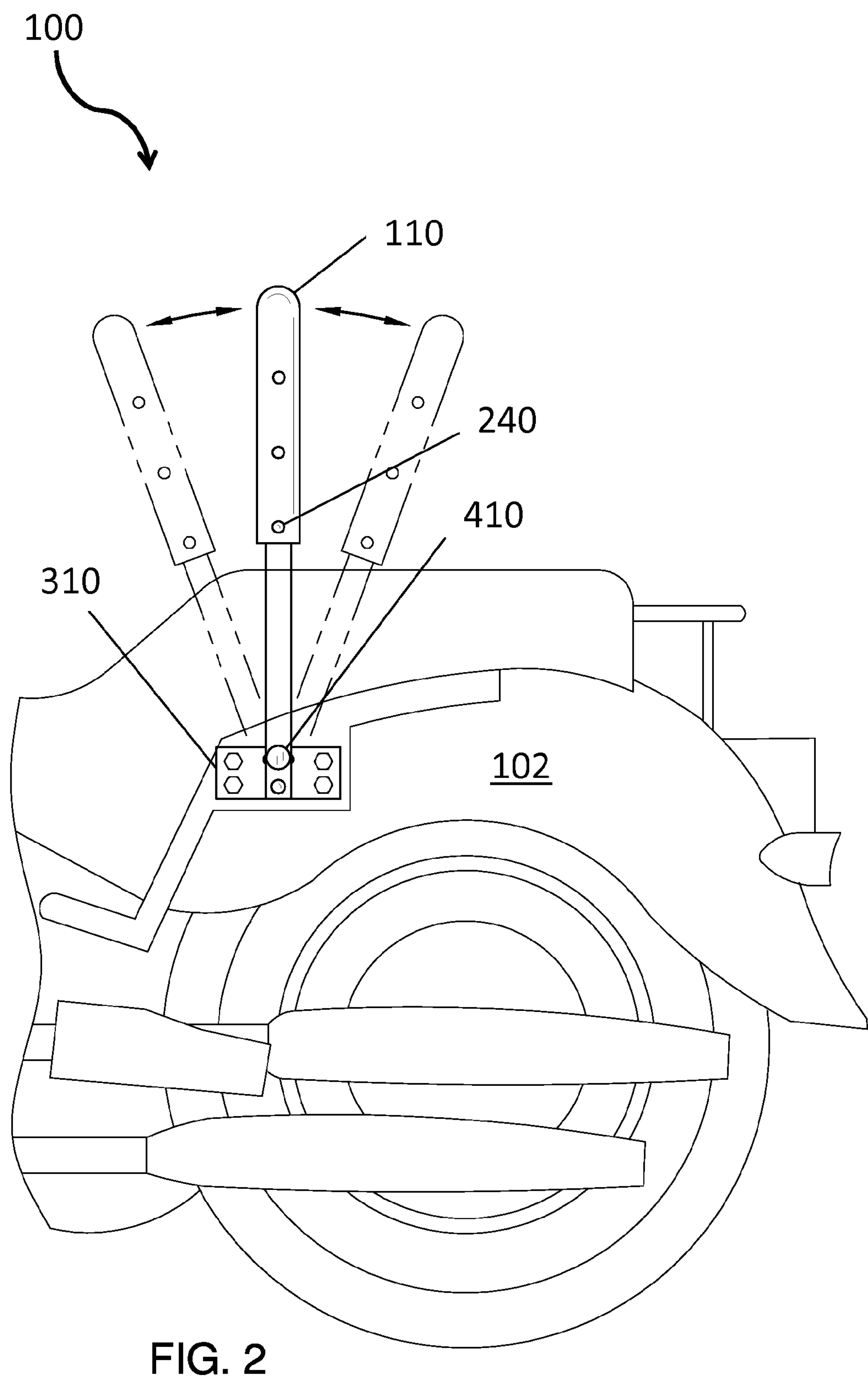
FIG. 2 is a side view of the safety bar device of FIG. 1 as attached to a motorcycle.

As shown in FIG. 2, in some embodiments, the second end 212 of the first inner bar 210 may be pivotally attached to the first mounting bracket 310 (e.g., via a first pivot component 315), and the second end 222 of the second inner bar 220 may be pivotally attached to the second mounting bracket 320 (e.g., via a second pivot component). This would allow the device 100 to also move forwardly and backwardly. This may allow a user to find a comfortable position for the gripping component 110. When a particular forward or backward position of the gripping component 110 is chosen, by the user the gripping component 110 can be locked in place via a second locking mechanism. At shown in FIG. 3, in some embodiments, the second locking mechanism may comprise a spring-loaded pull knob mechanism 405. Pull knob mechanisms are well known to one of ordinary skill in the art.

In some embodiments, a spring-loaded pull knob 410 may be disposed in the first inner bar 210 at or near second end 212. The spring-loaded pull knob 410 comprises a pin component 430 that is insertable into an aperture 460 disposed in the first mounting bracket 310. The pin component 430 can move between an in position (where it is inside the first inner bar 210) and an out position (where it extends out of the first inner bar 210 and in some instances through an aperture 460 in the mounting bracket 310). The pin component 430 is biased in the out position caused by a second spring 418. To move the pin component 430, a knob component 410 is disposed on the second end of the pin component 430. The knob component 410 extends outwardly from the first inner bar 310 and can be pulled outwardly, which pulls the pin component 430 to the in position. To move the gripping component 110 forwardly and backwardly, a user can pull the knob component 410, which moves the pin component 430 to the in position. The gripping component 110 can be moved backwardly and forwardly freely. When the user has chosen an appropriate position for the gripping component 110, he/she can release the knob component 410 and allow the pin component 430 to return to the out position and extend through an aperture 460 in the first mounting bracket 310. The second locking mechanism is not limited to a spring-loaded pull knob.

Figure 5:
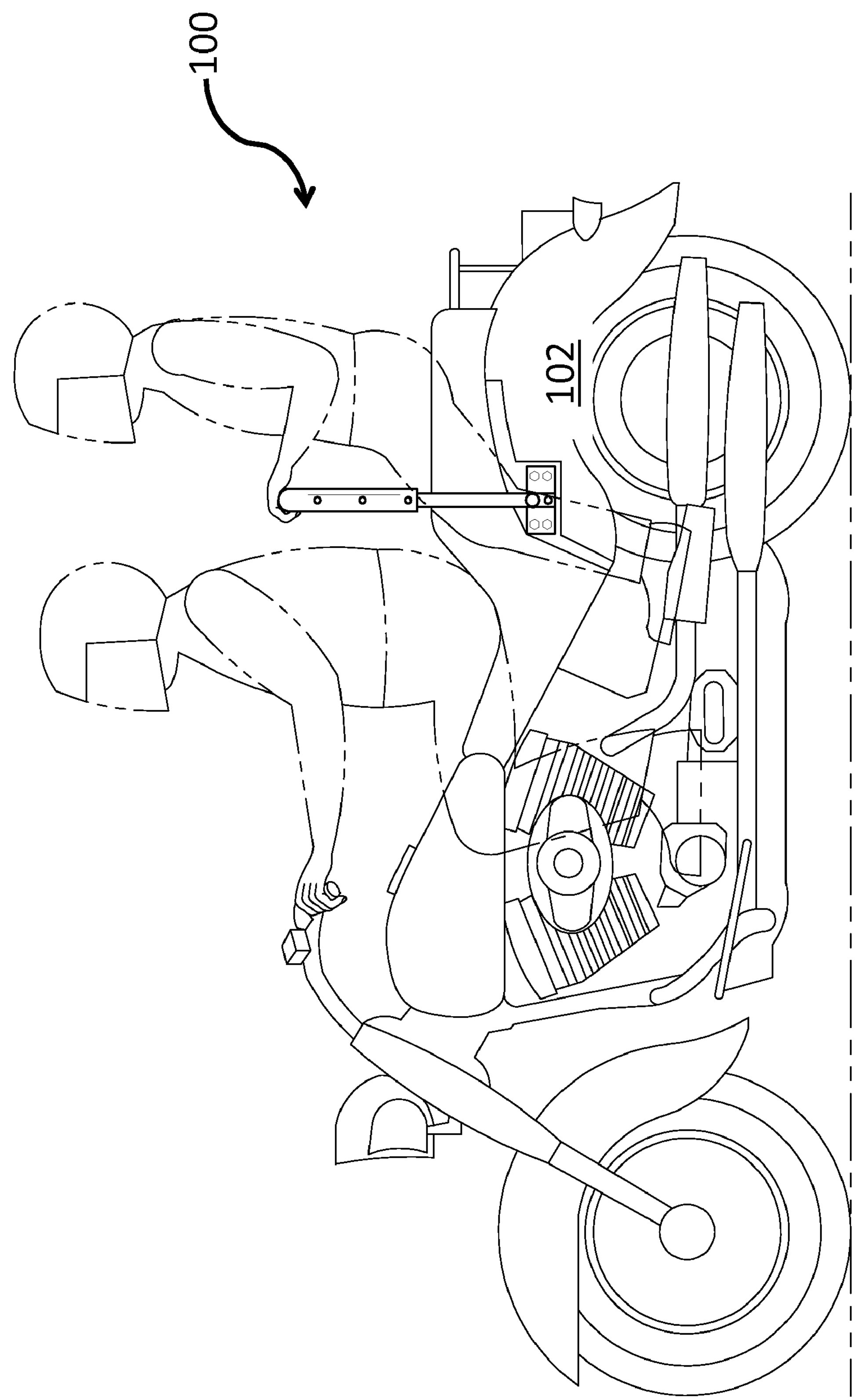
FIG. 5 is a first side view of the safety bar device of the present invention as used on a motorcycle.
Figure 6:
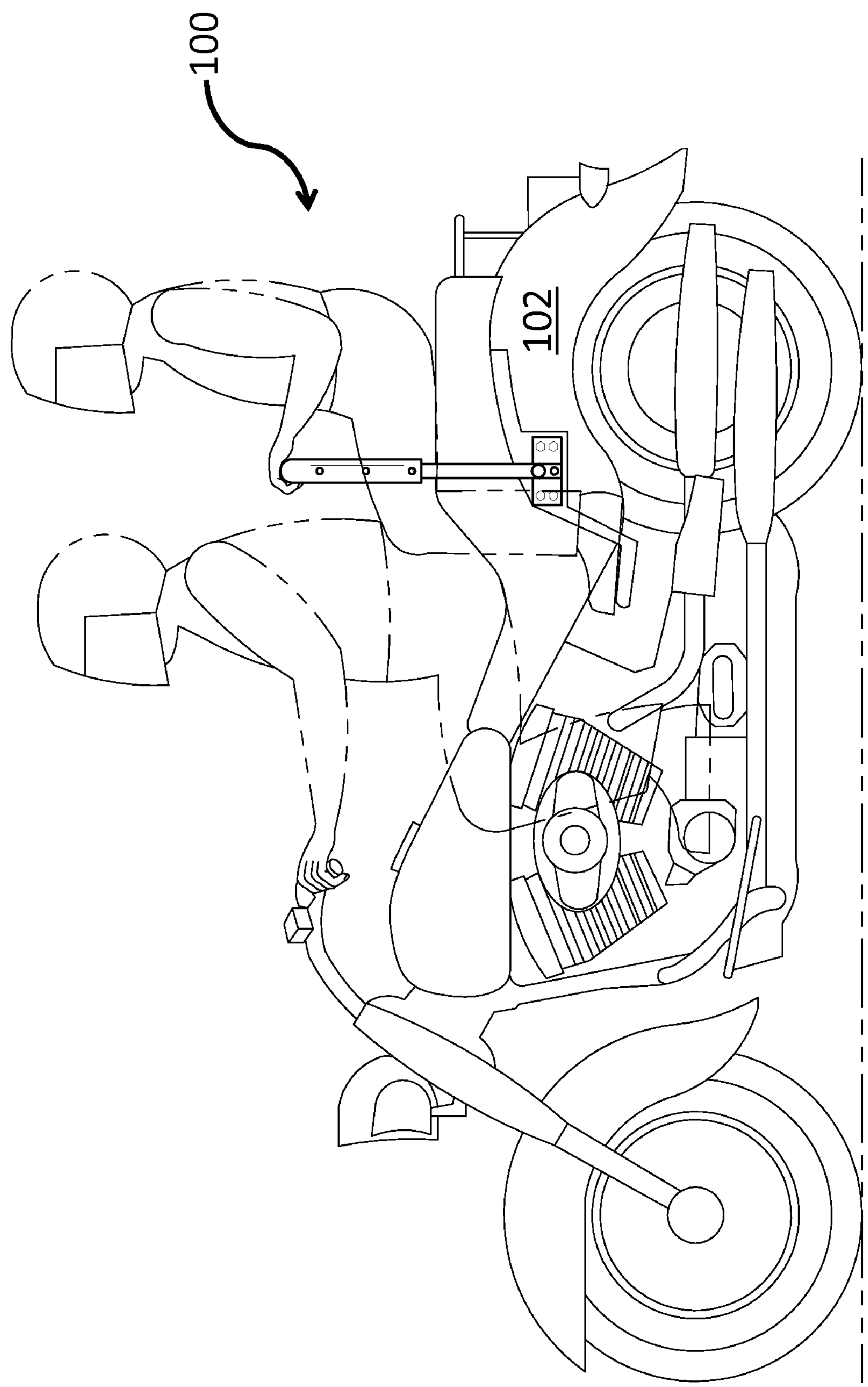
FIG. 6 is a second side view of the safety bar device of the present invention as used on a motorcycle.

As shown in FIG. 5 and FIG. 6, in some embodiments, a rear passenger can pull the gripping component 110 to a height of his/her choice and slide his/her legs underneath the gripping component 110 while sitting on the rear of the motorcycle 102. The device 100 of the present invention provides a solid comfortable alternative to gripping the driver. If a sudden acceleration or steering adjustment is made, the passenger may maintain a tight grip and may avoid toppling from the bike. The device 100 of the present invention provides for a means of securing a passenger's body (e.g., legs), which may provide additional comfort to the passenger.

The safety bar device 100 may be constructed in a variety of sizes. In some embodiments, the safety bar device 100 is between about 1 to 1.5 feet in height as measured from the second end 212 of the first inner bar 210 to the horizontal bar 113. In some embodiments, the safety bar device 100 is between about 1.5 to 2 feet in height as measured from the second end 212 of the first inner bar 210 to the horizontal bar 113. In some embodiments, the safety bar device 100 is between about 2 to 2.5 feet in height as measured from the second end 212 of the first inner bar 210 to the horizontal bar 113. In some embodiments, the safety bar device 100 is more than about 2.5 in height.

As used herein, the term "about" refers to plus or minus 10% of the referenced number. For example, an embodiment wherein the safety bar device 100 is about 2 feet in height includes a safety bar device 100 that is between 1.8 and 2.2 feet in height.

The following the disclosures of the following U.S. patents are incorporated in their entirety by reference herein: U.S. Pat. No. 4,030,750; U.S. Pat. Application No. 2003/006082; U.S. Pat. No. 6,868,584; U.S. Pat. No. 6,896,279; U.S. Pat. No. 5,667,232; U.S. Pat. No. 5,002,149; U.S. Pat. No. 6,568,699; U.S. Pat. No. 6,966,471.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A retractable safety bar device for a rear passenger of a motorcycle, said safety bar device comprising:

(a) a gripping component comprising both a first side bar adapted for telescopically receiving a first inner bar and a second side bar adapted for telescopically receiving a second inner bar;

wherein the safety bar device is adjustable in height by moving the gripping component upwardly and downwardly with respect to the first inner bar and the second inner bar, wherein the gripping component can be locked in place via a first locking mechanism; and (b) a first mounting bracket pivotally attached to a second end of the first inner bar and a second mounting bracket pivotally attached to a second end of the second inner bar, wherein the first mounting bracket and the second mounting bracket are for attaching the first inner bar to a first side of the motorcycle and the second inner bar to a second side of the motorcycle, respectively, via an attachment means;

wherein the safety bar device is adjustable in position by moving the first inner bar and second inner bar forwardly and backwardly with respect to the first mounting bracket and second mounting bracket, respectively, wherein the first inner bar can be locked in place via a second locking mechanism.

2. The safety bar device of claim 1, wherein the gripping component is generally U-shaped.

3. The safety bar device of claim 1, wherein the first locking mechanism is a spring-loaded push button mechanism.

4. The safety bar device of claim 1, wherein a spring-loaded push button is disposed in the first inner bar at or near a first end.

5. The safety bar device of claim 1, wherein the second locking mechanism is a spring-loaded pull knob mechanism.

6. The safety bar device of claim 1, wherein a spring-loaded pull knob is disposed in the first inner bar at or near second end.

7. The safety bar device of claim 1, wherein the device can accommodate the passenger's legs.

8. The safety bar device of claim 1, wherein the attachment means includes a screw/bolt mechanism.

* * * * *